Dec. 26, 1939.  H. M. ULLSTRAND  2,184,726
REFRIGERATION
Filed April 1, 1937
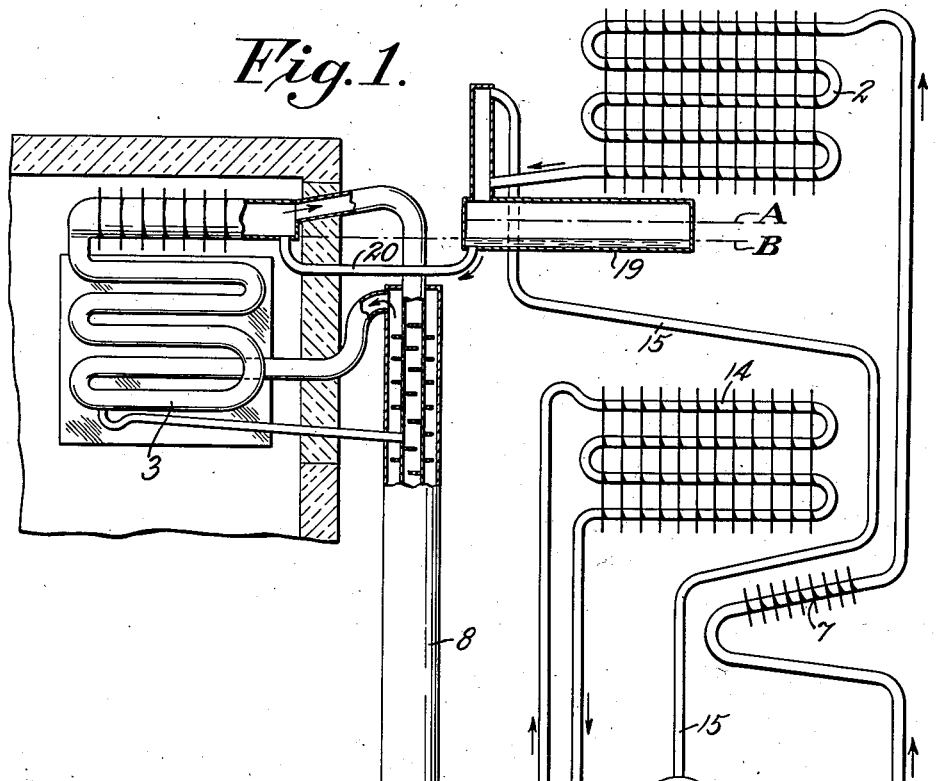
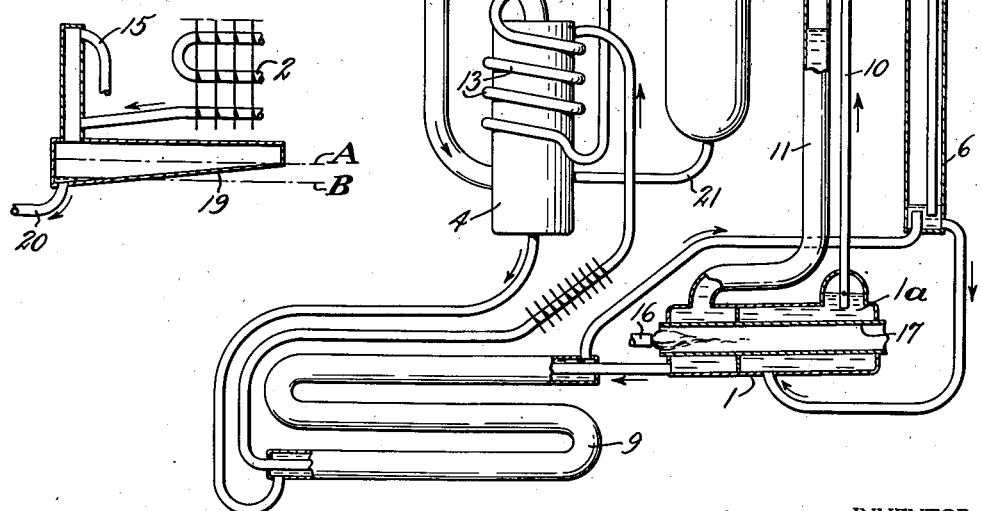
INVENTOR.
Hugo M. Ullstrand
BY
D. E. Heath
his ATTORNEY.

Patented Dec. 26, 1939

2,184,726

UNITED STATES PATENT OFFICE 2,184,726

REFRIGERATION

Hugo M. Ullstrand, Evansville, Ind., assignor to Servel, Inc., New York, N. Y., a corporation of Delaware Application April 1, 1937, Serial No. 134,203

4 Claims. (Cl. 62—119.5)

My invention relates to absorption type refrigeration systems making use of evaporation of refrigerant fluid in the presence of an inert gas and it is an object of the invention to provide a refrigeration system of this type having increased efficiency under normal operating conditions and having longer life as will appear from the following description and accompanying drawing in which Fig. 1 illustrates a refrigeration system embodying the invention; and Fig. 2 shows a modification.

Referring to the drawing, the system shown is generally like that described in United States Patent 1,609,334 to von Platen and Munters. The system is made up of a number of steel vessels and pipes welded together to form an hermetically sealed system. All the spaces of the system are in open and unrestricted communication so that all parts are at the same total pressure. The system contains hydrogen and a water solution of ammonia. Other suitable alternative fluids may be used.

The parts of the system include a generator 1, sometimes called a boiler or still, an ammonia condenser 2, an evaporator 3, an absorber 4, and a hydrogen reserve vessel 5, usually called a pressure vessel. The generator 1 is heated, for instance, by a gas burner 16 arranged so that the flame is projected into the lower end of the generator heating flue 17. Ammonia vapor is expelled from solution by heat in the generator 1 and flows through conduit 18, an analyzer 6, an air cooled rectifier 7, and into the ammonia condenser 2 where the ammonia is condensed to liquid. The liquid ammonia flows from the lower end of the condenser 2 into a vessel 19 from where it overflows through conduit 20 into the upper end of the evaporator 3.

Hydrogen circulates through and between the evaporator 3 and the absorber 4 by way of a gas heat exchanger 8. In the evaporator, the liquid ammonia evaporates and diffuses into the hydrogen, producing a refrigeration effect. In the absorber 4, ammonia vapor is absorbed out of the rich gas by weakened absorption solution. The absorber is cooled by a vaporization-condensation circuit containing a suitable volatile fluid, such as methyl chloride, and comprising a cooling coil 13 in heat exchange relation with the absorber and connected to an air cooled condenser 14. The gas circulation between the evaporator 3 and absorber 4 occurs as a result of the difference in weights of the columns of weak and rich gas, the column of gas containing the greater amount of the heavier ammonia vapor being heavier than the column of weak gas.

The absorption solution is circulated through and between the generator 1 and absorber 4 by way of a liquid heat exchanger 9 and circulation of the solution is caused by the lifting action of vapor formed in chamber 1a of the generator which raises solution through a riser 10 into the upper part of the generator standpipe 11 where the level is such that solution may overflow therefrom into the absorber.

The pressure vessel 5 is connected in a known manner to the absorber 4 by a conduit 21. In accordance with my invention the pressure vessel is also connected by a conduit 15 to the upper part of the vessel 19 to which the lower end of the ammonia condenser 2 is connected. The vessel 19 is arranged so that the lower part thereof is located substantially at the level of the point at which conduit 20 opens in the upper part of the evaporator 3. We will refer to this level as the overflow level in the evaporator. As previously described, liquid drains from the condenser 2 into the vessel 19 and thence overflows through conduit 20 into the upper part of the evaporator 3.

The relation between the surface level of liquid in the vessel 19 and the evaporator overflow level depends upon the difference in weights of the column of gas in the previously described circuit comprising the evaporator, gas heat exchanger, and absorber on one hand, and on the other hand the gas column in the pressure vessel 5 and the vent conduit 15. In a warm room the pressure vessel and vent conduit 15 are filled with the heavier ammonia vapor so that the surface level of liquid in the vessel 19 is considerably above the overflow level at the evaporator. In a warm room the level of liquid in this vessel may be at A. Under these conditions the quantity of liquid ammonia represented by the volume of the vessel 19 below the surface level A and the volume of the conduit 20 is trapped out of circulation, that is, kept out of the liquid circuit so that the solution circulating through and between the generator and absorber is at a lower average concentration. As the room temperature decreases, the amount of ammonia vapor in the pressure vessel and conduit 15 decreases so that the surface level of liquid in the vessel 19 drops. As the room temperature decreases, the surface level of liquid in the vessel 19 may drop to the level B. The quantity of liquid ammonia represented by the volume of the vessel 19 between the surface levels A and B is now returned into circulation resulting in a higher concentration of solution circulating between the generator and absorber.

The above weakening of the solution in a warm room is to obtain a desired capacity to take care of the load under these conditions. The increase in concentration of solution at medium and cool room temperatures results in greater efficiency of operation under conditions encountered during the greater part of the time of operation. The greater solution concentration during normal operation also results in greater life of the system due to resulting lower average boiler or generator temperatures.

The reason for the variation in the surface level of liquid in the vessel 19 is that the amount of ammonia in the vent conduit 15 and the pressure vessel 5 varies with the room temperature so that the weight of the column of gas in the pressure vessel and vent conduit increases and decreases in accordance with the room temperature. The lower part of the pressure vessel being connected to the lower part of the absorber, the column of gas in the pressure vessel and vent conduit is balanced by the communicating column of gas in the circuit formed by the absorber, gas heat exchanger, and the evaporator. The difference in weights of these two columns is compensated by a difference in surface levels of liquid in the trap formed by conduit 20 which connects the vessel 19 to the upper part of the evaporator 3 and thus the upper ends of the two gas columns. To understand this more clearly it may be pointed out that if the liquid trap, in conduit 20, were absent and the upper ends of the two gas columns in open communication, a circulation of gas would occur between the two columns in tending to equalize the weights of the two columns. The trapped liquid opposes this circulation so that liquid is raised in the trap in the direction that such circulation would occur. By properly dimensioning the vessel 19, the quantity of liquid ammonia contained in this vessel between the levels A and B may be determined with respect to the quantity of absorption liquid so that a desired variation in concentration of the solution will be obtained for a given distance between levels A and B. In actual practice, the difference in the liquid surface levels A and B, where B is the evaporator overflow level, has been observed to be ¾" in a 100° room.

The amount of liquid held out of circulation in the vessel 19 may be a variable amount per increment change in liquid level by forming the vessel 19 with a variable cross-sectional area as shown in Fig. 2. In this modification an increasingly greater amount of liquid is held out of circulation for each increment of increase in the liquid level.

What is claimed is:
1. In a refrigeration system employing evaporation of refrigerant fluid in the presence of inert gas, absorption of refrigerant fluid into liquid absorbent, and expulsion of refrigerant fluid from solution in the absorbent, that improvement which consists in forming an accumulation of refrigerant fluid in liquid phase apart from the liquid absorbent upon increase in load, and increasing said accumulation by adding amounts which are increasingly greater as the load increases to correspondingly decrease the concentration of refrigerant fluid in solution.

2. A refrigeration system having a circuit for inert gas including an evaporator and an absorber at a lower level than said evaporator, a chamber having a substantial horizontal cross-sectional area, means for conducting liquid refrigerant to said chamber, a conduit for conducting liquid by gravity from said chamber to said evaporator including a liquid trap seal, and a second conduit for gas from the upper part of said chamber to said absorber, said chamber being located so that surface level of liquid due to said trap rises in the chamber upon increase in weight of the column of gas in said second conduit relative to the weight of the column of gas in said circuit and causes collection of an appreciable quantity of liquid refrigerant upon even a small rise in liquid level due to the substantial horizontal cross-sectional area of said chamber.

3. A refrigeration system having a circuit for inert gas including an evaporator and an absorber at a lower level than said evaporator, a condenser, a chamber having a substantial horizontal cross-sectional area connected to receive liquid from said condenser, a conduit for conducting liquid by gravity from said chamber to said evaporator including a liquid trap seal, and a second conduit for gas from the upper part of said chamber to the lower part of said circuit for inert gas, said chamber being located so that the surface level of liquid due to said trap rises in the chamber upon increase in weight of the column of gas in said second conduit relative to the weight of the column of gas in said circuit and causes collection of an appreciable quantity of liquid refrigerant upon even a small rise in liquid level due to the substantial horizontal cross-sectional area of said chamber.

4. A refrigeration system as set forth in claim 3 in which said chamber has upward increasing horizontal cross-sectional areas so that an increasingly greater amount of liquid is held out of circulation upon each increment of increase in liquid level in said chamber.

HUGO M. ULLSTRAND.